US010200678B2

(12) United States Patent
Izzat et al.

(10) Patent No.: US 10,200,678 B2
(45) Date of Patent: *Feb. 5, 2019

(54) SYSTEM AND METHOD FOR COMBINING TEXT WITH THREE-DIMENSIONAL CONTENT

(71) Applicant: THOMSON LICENSING, Issy-les-Moulineaux (FR)

(72) Inventors: Izzat Izzat, Cary, NC (US); Dong-Qing Zhang, Bridgewater, NJ (US); Yousef Wasef Nijim, Rosewell, GA (US)

(73) Assignee: InterDigital CE Patent Holdings, Colonel Moll (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,834

(22) Filed: Jul. 12, 2017

(65) Prior Publication Data
US 2017/0310951 A1 Oct. 26, 2017

Related U.S. Application Data

(63) Continuation of application No. 12/531,101, filed as application No. PCT/US2007/025947 on Dec. 19, 2007, now Pat. No. 9,769,462.
(Continued)

(51) Int. Cl.
H04N 13/00 (2018.01)
H04N 13/293 (2018.01)
(Continued)

(52) U.S. Cl.
CPC ......... *H04N 13/293* (2018.05); *H04N 13/128* (2018.05); *H04N 13/156* (2018.05);
(Continued)

(58) Field of Classification Search
None
See application file for complete search history.

(56) References Cited

U.S. PATENT DOCUMENTS 4,925,294 A 5/1990 Geshwind et al.
5,784,097 A 7/1998 Iinuma et al.
(Continued)

FOREIGN PATENT DOCUMENTS

CN 1726726 A 1/2006
CN 102318352 1/2012
(Continued)

OTHER PUBLICATIONS

Siegel, Mel, et al., "Just Enought Reality: Comfortable 3-D Viewing via Microstereopsis," IEEE Robotics Inst., Carnegie Mellon, Apr. 2000.

*Primary Examiner* — James M Anderson, II
(74) *Attorney, Agent, or Firm* — Brian J. Dorini; Xiaoan Lu

(57) ABSTRACT

A system (10) and method (52, 60, 72) for combining and/or displaying text with three-dimensional (3D) content. The system (10) and method (52, 60, 72) inserts text at the same level as the highest depth value in the 3D content. As a result, the system (10) and method (52, 60, 72) of the present disclosure produces text combined with 3D content wherein the text does not obstruct the 3D effects in the 3D content and does not create visual fatigue when viewed by a viewer.

1 Claim, 4 Drawing Sheets

Related U.S. Application Data

(60) Provisional application No. 60/918,635, filed on Mar. 16, 2007.

(51) Int. Cl.
*H04N 13/128* (2018.01)
*H04N 13/156* (2018.01)
*H04N 13/183* (2018.01)
*H04N 13/275* (2018.01)
*H04N 13/361* (2018.01)

(52) U.S. Cl.
CPC ......... *H04N 13/183* (2018.05); *H04N 13/275* (2018.05); *H04N 13/361* (2018.05); *H04N 2213/003* (2013.01)

(56) References Cited

U.S. PATENT DOCUMENTS

2002/0008906 A1* 1/2002 Tomita ............... G02B 27/2264
                                                                359/462
2004/0101043 A1    5/2004  Flack et al.
2004/0255249 A1   12/2004  Chang et al.
2006/0204075 A1*  9/2006  Mashitani .......... H04N 13/0003
                                                                382/154
2008/0158250 A1    7/2008  Surti et al.

FOREIGN PATENT DOCUMENTS

| | | |
|---|---|---|
| EP | 1548648 A | 6/2005 |
| EP | 1549084 | 6/2005 |
| JP | 58003056 | 1/1983 |
| JP | 63167594 A | 7/1988 |
| JP | 1150981 | 6/1989 |
| JP | 2001283247 | 10/2001 |
| JP | 2003260265 | 9/2003 |
| JP | 2004274125 A | 9/2004 |
| WO | WO9624117 | 8/1996 |
| WO | WO03100727 | 12/2003 |
| WO | 2006111893 A | 10/2006 |

\* cited by examiner

SYSTEM AND METHOD FOR COMBINING TEXT WITH THREE-DIMENSIONAL CONTENT

CROSS-REFERENCE TO RELATED APPLICATIONS

This application is a continuation application of U.S. Non-Provisional patent application Ser. No. 12/531,101, filed on Jun. 4, 2010, which is a 371 of International Application No. PCT/US07/025947 filed on Dec. 19, 2007, which claims the benefit of U.S. Provisional Patent Application Ser. No. 60/918,635 filed on Mar. 16, 2007, all of which are incorporated by reference herein in their respective entireties.

TECHNICAL FIELD OF THE INVENTION

The present disclosure generally relates to image processing and display systems, and more particularly, to a system and method for combining text with three-dimensional content.

BACKGROUND OF THE INVENTION

There are two types of text that may be added to video: subtitles and captions. Generally speaking, subtitles are intended for hearing audiences and captions for deaf audiences. Subtitles may translate the dialog into a different language, but rarely show all of the audio. For example, captions show sound effects (e.g., "phone ringing" and "footsteps"), while subtitles don't.

Closed captions are captions that are hidden in a video signal, invisible without a special decoder. The closed captions are hidden, for example, in line 21 of the vertical blanking interval (VBI). Open captions are captions that have been decoded, so they have become an integral part of the television picture, like subtitles in a movie. In other words, open captions cannot be turned off. The term "open captions" is also used to refer to subtitles created with a character generator.

The use of text in two-dimensional (2D) video is known by those skilled in the art. The current interest in three-dimensional (3D) video and film has created the need for techniques to add text to 3D content. Therefore, a need exists for techniques for optimizing the insertion of text into 3D content such that the added text does not obstruct the 3D effects in the 3D content and does not create visual fatigue when the 3D content is viewed.

SUMMARY

According to one aspect of the present disclosure, a system and method for combining and/or displaying text with three-dimensional (3D) content is provided. The system and method inserts text at the same level as the highest depth value in the 3D content. One example of 3D content is a two-dimensional image and an associated depth map. In this case, the depth value of the inserted text is adjusted to match the largest depth value of the given depth map. Another example of 3D content is a plurality of two-dimensional images and associated depth maps. In this case, the depth value of the inserted text is continuously adjusted to match the largest depth value of a given depth map. A further example of 3D content is stereoscopic content having a right eye image and a left eye image. In this case the text in one of the left eye image and right eye image is shifted to match the largest depth value in the stereoscopic image. Yet another example of 3D content is stereoscopic content having a plurality of right eye images and left eye images. In this case the text in one of the left eye images or right eye images is continuously shifted to match the largest depth value in the stereoscopic images. As a result, the system and method of the present disclosure produces text combined with 3D content wherein the text does not obstruct the 3D effects in the 3D content and does not create visual fatigue when viewed by a viewer.

According to another aspect of the present disclosure, a method for combining text with three-dimensional image content receiving three-dimensional image content, determining a maximum depth value for the three-dimensional content, and combining text with the three-dimensional image content at the maximum depth value.

According to a further aspect of the present disclosure, a method of displaying text with three-dimensional image content includes receiving three-dimensional image content and text, the three-dimensional image content having a maximum depth value, displaying the three-dimensional image content, and displaying the text at the maximum depth value.

According to yet another aspect of the present disclosure, a system for combining text with three-dimensional image content includes means for receiving three-dimensional image content, means for determining a maximum depth value for the three-dimensional content, and means for combining text with the three-dimensional image content at the maximum depth value.

According to yet a further aspect of the present disclosure, a system for displaying text with three-dimensional image content includes means for receiving three-dimensional image content and text, the three-dimensional image content having a maximum depth value, means for displaying the three-dimensional image content, and means for displaying the text at the maximum depth value.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

Figure 1:
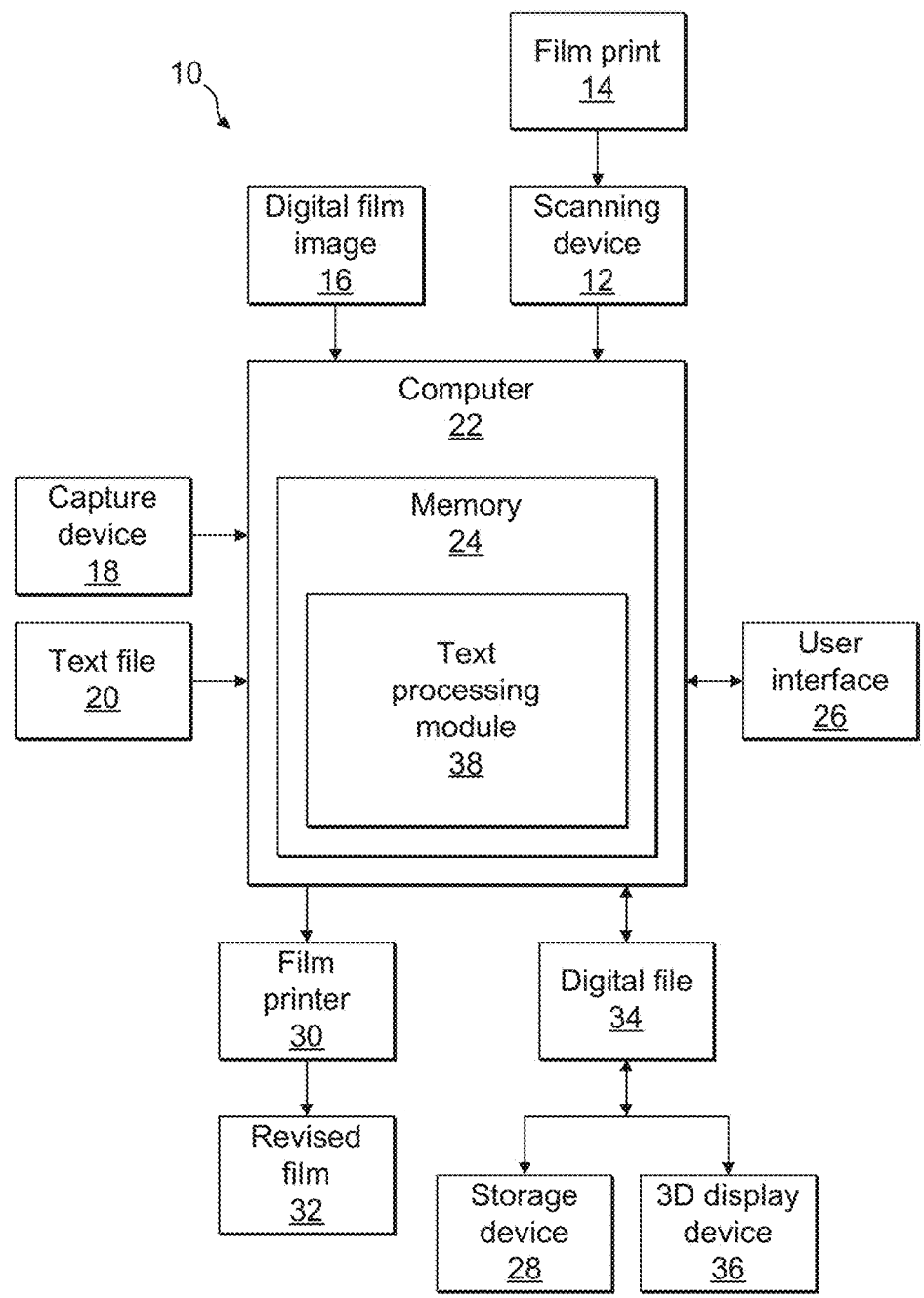
FIG. 1 is an exemplary illustration of a system for combining text with three-dimensional content according to an aspect of the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Referring now to FIG. 1, exemplary system components 10 according to an embodiment of the present disclosure are shown. A scanning device 12 may be provided for scanning film prints 14, e.g., camera-original film negatives, into a digital format, e.g., a Cineon-format or Society of Motion Picture and Television Engineers (SMPTE) Digital Picture Exchange (DPX) files. The scanning device 12 may comprise, e.g., a telecine or any device that will generate a video output from film such as, e.g., an Arri LocPro™ with video output. Alternatively, files from the post production process or digital cinema 16 (e.g., files already in computer-readable form) can be used directly. Potential sources of computer-readable files are AVID™ editors, DPX files, D5 tapes, etc. Furthermore, 3D content (e.g., stereoscopic content or 2D images and associated depth maps) may be provided by a capture device 18 and text files 20 (e.g., subtitle or caption files) may be created from a script and provided to the system by subtitle supervisor.

The scanned film prints, digital film images and/or 3D content as well as the text files may be input to a post-processing device 22, e.g., a computer. The computer 22 may be implemented on any of the various known computer platforms having hardware such as one or more central processing units (CPU), memory 24 such as random access memory (RAM) and/or read only memory (ROM) and input/output (I/O) user interface(s) 26 such as a keyboard, cursor control device (e.g., a mouse or joystick) and display device. The computer platform also includes an operating system and micro instruction code. The various processes and functions described herein may either be part of the micro instruction code or part of a software application program (or a combination thereof) which is executed via the operating system. In addition, various other peripheral devices may be connected to the computer platform by various interfaces and bus structures, such a parallel port, serial port or universal serial bus (USB). Other peripheral devices may include additional storage devices 28 and a printer 30. The printer 30 may be employed for printing a revised version of the film 32, e.g., a stereoscopic version of the film, wherein text has been inserted into a scene or a plurality of scenes using the text insertion techniques described below. Additionally, a digital file 34 of the revised film or video may be generated and provided to a 3D display device so the 3D content and inserted text can be viewed by a viewer. Alternatively, the digital file 34 may be stored on storage device 28.

A software program includes a text processing module 38 stored in the memory 24 for combining text with 3D content in accordance with the present disclosure, as discussed in further detail below.

There are a number of techniques for presenting 3D content. The most common is stereoscopic displays, which requires active or passive glasses. Autostereoscopic displays, using for example Lenticular, do not require glasses and are becoming more available for both home and professional entertainments. Many of these displays operate on the 2D+depth format. In this format, the 2D video and the depth information are combined to create the 3D effect.

The present disclosure is directed towards a method for inserting subtitles in the 3D video for 2D+depth and stereo type displays. For 2D+depth displays, the proposed method inserts subtitle text at the same level as the highest depth value in the picture. More specifically, the depth value of the inserted subtitle may be continuously adjusted to match the largest depth value of the depth map. For stereo content, the proposed method adjusts the disparity value of the subtitle in the right image. This produces more visually pleasing subtitles that do not obstruct the 3D effects of the video.

Subtitles can be placed on a video signal in one of two ways: Online (live) or Offline (post-production). Online subtitle is done as an event occurs. Examples of online subtitle are television news shows, live seminars, and sports events. Online subtitles can be done from a script, or actually created in real time. Offline subtitle is done "after the fact" in a studio. Examples of offline captioning include television game shows, videotapes or DVDs of movies, corporate videotapes (e.g., training videos), movies provided via cable, satellite or the Internet, or the like. The text of the subtitle is created on a computer, and synchronized to the video using time codes. The text and the video are then transferred to the videotape before it is broadcast or distributed.

In the present disclosure, the creation and distribution of subtitles preferably follows conventional processes as known by those skilled in the art. For example, one conventional process is creating a text file from a script. The text file contains three values (start frame, end frame, and text). The text are then repeated in the all the frames from start frame to end frame. The present disclosure is directed towards adjusting the depth value of the text location such that the text location depth value matches the largest depth value in the video frame.

Figure 2:
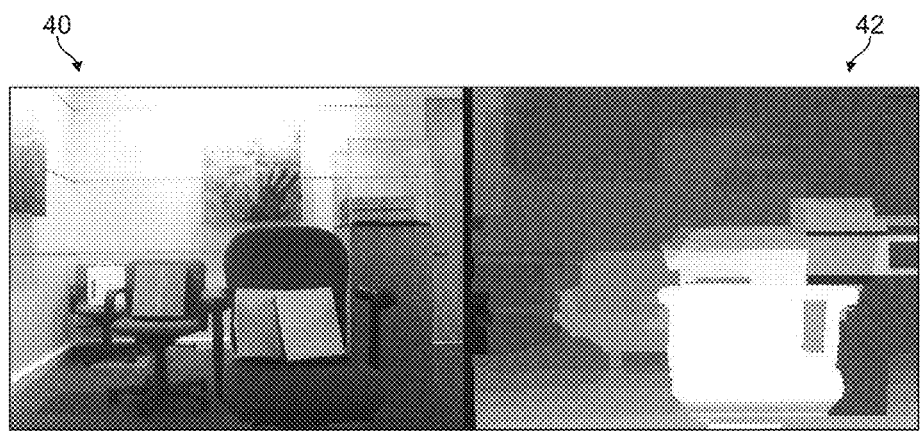
FIG. 2 illustrates an example of a 2D image and a depth map associated with the 2D image.

There are a number of content formats and displays in the market including stereoscopic, holographic, and autostereoscopic among others. Referring now to FIG. 2, one embodiment of the present disclosure is directed towards an approach for the insertion of subtitles in autostereoscopic displays that operate on the 2D+depth format. FIG. 2 illustrates an example of 2D+depth content format. More specifically, FIG. 2 illustrates two types of contents: a 2D image 40 and a depth map 42 of the 2D image. The depth map 42 defines the depth value at each pixel in the 2D image 40 with light pixels represent points close to the viewer, and dark pixels represent points away from the viewer.

As discussed above, there are two ways to insert subtitles: online insertion for live content and offline insertion for post-production content. As discussed below, the proposed methods of the present disclosure are directed towards both offline and online subtitle insertion.

Figure 3:
FIG. 3 illustrates an example of text added to the 2D image and the depth map associated with the 2D image in accordance with the present disclosure.

Referring now to FIG. 3, an example of a text box 50 inserted in a depth map 46 and the text 48 added to the 2D image 44 is shown. The text box 48 is the subtitle text as defined by the script, for example, while text box 50 represents a constant depth value at every point of the text box.

Figure 4:
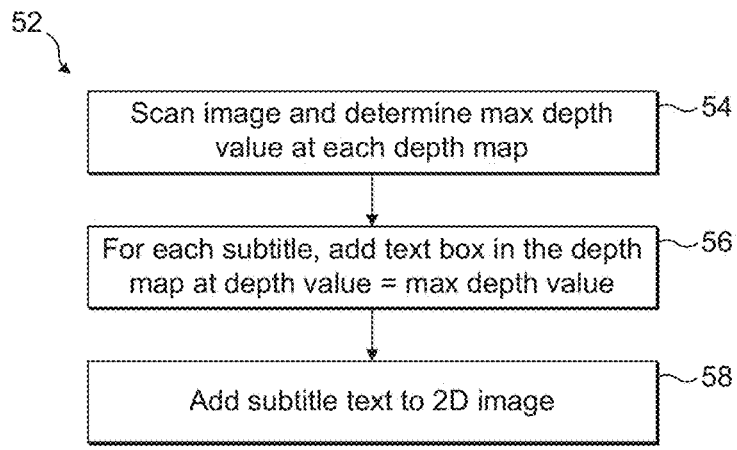
FIG. 4 is a flowchart illustrating an offline subtitle insertion process in accordance with the present disclosure.

Referring now to FIG. 4, an offline insertion process 52 of the present disclosure is shown. For offline insertion of subtitles, subtitle text images are created and synchronized to 2D video using time codes at post production. The depth values of the inserted text are determined by scanning, at step 54, the 3D video and calculating the max value of the depth for each frame during the content creation. A new text box is then inserted, at step 56, at the subtitle location with depth value equal to the max depth value of the fame, and at step 58, the subtitle is added to the 2D image 44. This process should be done for the duration of the time interval defined for the subtitle. It should be noted that steps 56 and 58 may be performed in any order and may be preferably performed simultaneously.

Figure 5:
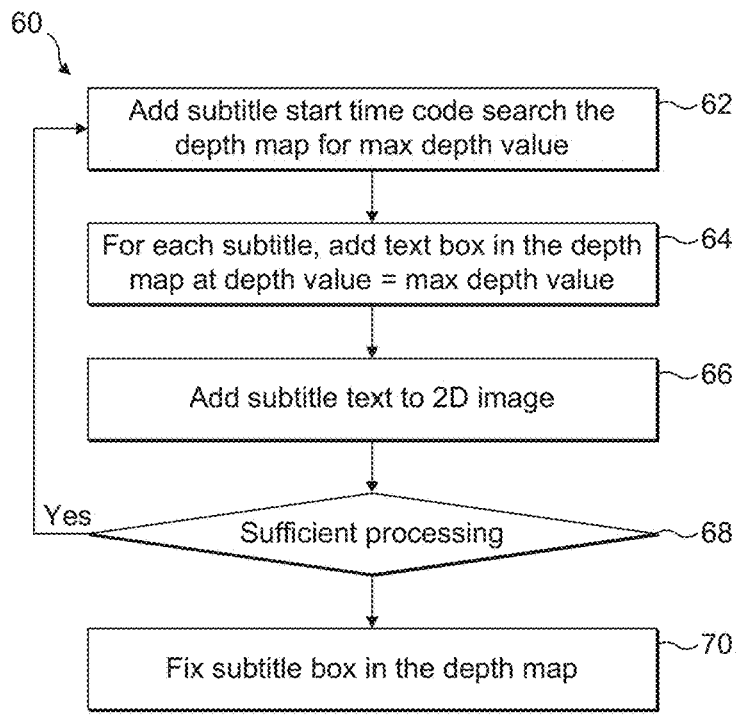
FIG. 5 is a flowchart illustrating an online subtitle insertion process in accordance with the present disclosure.

Referring now to FIG. 5, a flowchart of the present disclosure illustrating an online insertion process 60 is shown. In online processing, the location of the subtitles is not known in advance and hence the depth value of the subtitles cannot be determined in the same manner as described for offline processing 52. As soon as subtitle text in entered, at step 62, the depth map of the subtitle start frame is raster scanned to determine the max depth value and, at step 64, the subtitle text is inserted at the max depth value and, at step 66, the subtitle is added to the 2D image. It should be noted that steps 64 and 66 may be performed in any order and may be preferably performed simultaneously. Afterwards, at step 68, a determination is made on whether additional processing resources exist. Depending on the available processing, the subtitle can either be fixed, at step 70, at the first frame depth value when additional processing is not available or the depth values of following frames can be determined by repeating the online processing steps 62-66 when additional processing is available.

Figure 6:
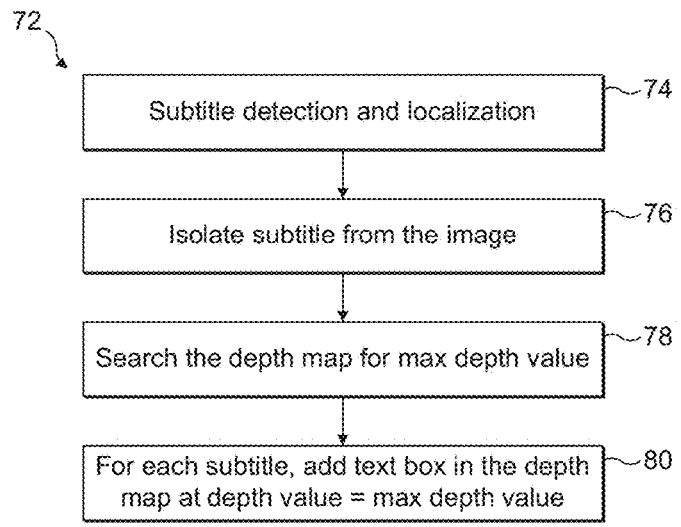
FIG. 6 illustrates an online subtitle detection and insertion process in accordance with the present disclosure.

Referring now to FIG. 6, a flowchart of the present disclosure illustrating the processing 72 of 2D images having inserted subtitles is shown. There are cases where subtitles are already inserted in the 2D image such as if the 3D content is converted from 2D content. For these cases, the location of subtitles can be identified, at step 74, by subtitle region detectors, which are able to detect and locate the subtitle regions in a frame using texture and color information. Subtitle region detection has been an active research direction in video processing research. According to current literature, for some videos, such as news videos, subtitle region detectors can achieve localization accuracy above 95%. Therefore, subtitle region detectors should be reliable enough for 3D subtitle insertion. Once the subtitle area is localized (i.e., the coordinate of the text box is determined), at step 74, and the subtitle text is isolated (i.e., the specific pixels of the subtitle are determined), at step 76, from the image, the depth map of the subtitle start frame is searched (e.g., raster scanned) to determine, at step 78, the max depth value. Next, at step 80, the subtitle text is inserted at the max depth value. Afterwards, the online insertion process steps 66-70 shown in FIG. 5 may be applied.

Figure 7:
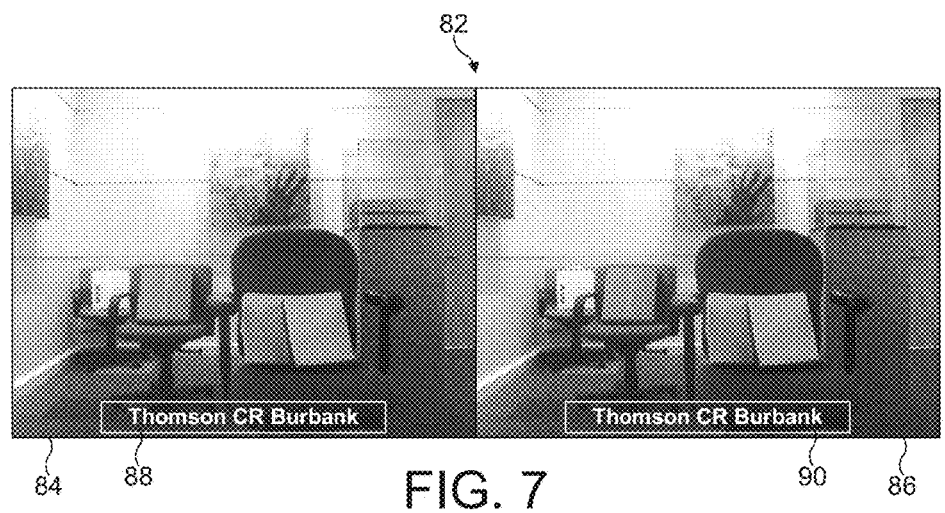
FIG. 7 illustrates an example of text combined with a stereo pair in accordance with the present disclosure.

Referring now to FIG. 7, the present disclosure can also be extended to cover stereoscopic content 82. For stereoscopic content the text in either the left or the right eye image is shifted to match the largest depth value in the stereoscopic image. For example, the text 88 may be fixed in the left eye image 84 but adjusted or varied in the right eye image 86. The variation of the text 90 in the right eye image 86 is proportional to the disparity of the stereo pair. The disparity value is inversely proportional to the depth value.

The variation in the eye is a shift in the horizontal direction. A negative shift (outside the screen text) is preferable for most applications. However the present disclosure allows for both negative and positive shifts of the text. The minimum allowed shift value equals to the maximum visually acceptable positive value and the maximum allowed shift value equals to the maximum visually acceptable negative value. FIG. 7 shows an example of stereo pair with a 10 pixel shift value for the text 90 in the right eye image 86.

It should be noted that, in accordance with the present disclosure, it is desirable to combine text with 3D content (e.g., stereoscopic content or 2D Images and associated depth maps) such that the text is occasionally or continuously positioned at the maximum depth value of the 3D content. Below, several approaches to acquiring depth information from 3D content are further discussed.

Acquiring depth information can be done using active or passive techniques. Passive approaches acquire 3D geometry from images or videos taken under regular lighting conditions. 3D geometry is computed using the geometric or photometric features extracted from images and videos. Active approaches use special light sources, such as laser, structure light or infrared light. They compute the geometry based on the response of the objects and scenes to the special light projected onto the surface.

Single-view approaches recover 3D geometry using one image taken from a single camera viewpoint. Examples include photometric stereo and depth from defocus. Multi-view approaches recover 3D geometry from multiple images taken from multiple camera viewpoints, resulted from object motion, or with different light source positions. Stereo matching is an example of multi-view 3D recovery by matching the pixels in the left image and right images in the stereo pair to obtain the depth information of the pixels.

Geometric methods recover 3D geometry by detecting geometric features such as corners, lines or contours in single or multiple images. The spatial relationship among the extracted corners, lines or contours can be used to infer the 3D coordinates of the pixels in images. Photometric methods recover 3D geometry based on the shading or shadow of the image patches resulted from the orientation of the scene surface.

For the application of the present disclosure, there are three possible types of content: computer generated content, stereo content and 2D content. For computer generated content, such as used in animation, depth information is available with very limited processing. For stereo content, the right and left image can be used to generate the depth by matching the pixel in the left image to that in the right image. The most complex case is that of 2D content. Most current techniques involve extensive manual processing and hence must be done off-line. For digital cinema applications, the 2D content is converted to stereo pair for playback in digital theaters. Once the stereo pair is acquired, stereo techniques can be used to obtain a depth map. In general for subtitle applications highly accurate and dense depth maps are usually not needed.

Although the embodiments which incorporate the teachings of the present disclosure has been shown and described in detail herein, those skilled in the art can readily devise many other varied embodiments that still incorporate these teachings. Having described preferred embodiments for a system and method for parallel image processing in a networked computing environment with optimal image data partition schemes (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method of displaying text with three-dimensional image content to prevent obstruction in a three-dimensional image, the method comprising:
receiving three-dimensional image content and text, the three-dimensional image content having a maximum depth value;
determining the maximum depth value of the three-dimensional image content;
displaying the three-dimensional image content; and
displaying the text at the maximum depth value.

* * * * *